(12) United States Patent
Rasmussen

(10) Patent No.: US 9,132,602 B2
(45) Date of Patent: Sep. 15, 2015

(54) GAS FILLED CROSSLAMINATE AND METHOD AND APPARATUS FOR ITS MANUFACTURE

(75) Inventor: Ole-Bendt Rasmussen, Walchwil (CH)

(73) Assignee: The Glad Products Company, Oakland, CA (US)

( * ) Notice: Subject to any disclaimer, the term of this patent is extended or adjusted under 35 U.S.C. 154(b) by 921 days.

(21) Appl. No.: 13/382,809

(22) PCT Filed: Jul. 7, 2010

(86) PCT No.: PCT/EP2010/059751
§ 371 (c)(1),
(2), (4) Date: Mar. 1, 2012

(87) PCT Pub. No.: WO2011/003952
PCT Pub. Date: Jan. 13, 2011

(65) Prior Publication Data
US 2013/0017369 A1    Jan. 17, 2013

(30) Foreign Application Priority Data
Jul. 8, 2009 (GB) .................................. 0911822.5

(51) Int. Cl.
*B32B 3/00* (2006.01)
*B32B 3/12* (2006.01)
*B32B 37/00* (2006.01)
(Continued)

(52) U.S. Cl.
CPC ............. *B32B 3/12* (2013.01); *B32B 37/0076* (2013.01); *B32B 37/0084* (2013.01); *B32B 37/153* (2013.01); *B32B 2307/546* (2013.01); *B32B 2307/5825* (2013.01); *B32B 2307/718* (2013.01); *B32B 2323/04* (2013.01); *B32B 2323/10* (2013.01); *B32B 2439/06* (2013.01); *B32B 2553/026* (2013.01); *Y10T 428/2457* (2015.01); *Y10T 428/24562* (2015.01); *Y10T 428/24826* (2015.01)

(58) Field of Classification Search
CPC ........ B32B 3/00; B32B 3/12; B32B 37/0076; B32B 37/0084; B32B 37/153; B32B 2323/10; B32B 2553/026; B32B 2307/718; B32B 2307/5825; B32B 2307/546; B32B 2439/06; Y10T 428/24826; Y10T 428/24562; Y10T 428/2457
USPC ................... 428/166, 178, 198; 156/290, 145
See application file for complete search history.

(56) References Cited

U.S. PATENT DOCUMENTS

2007/0257402 A1* 11/2007 Rasmussen .................. 264/339

FOREIGN PATENT DOCUMENTS

WO    WO 2006120238 A2 * 11/2006

*Primary Examiner* — Catherine A Simone
(74) *Attorney, Agent, or Firm* — Thomas C. Feix

(57) ABSTRACT

Crosslaminates of thermoplastic films have at least one of the films formed as a fluted structure, and two films are laminated to one another in such a manner that pockets are formed which contain gas. The pockets allow passage of gas between at least two adjacent flutes, whereby the product has an improved handle, and bags formed of the laminate have good stacking properties when filled with coarse particulates. The flute pitch is generally no more than 3 mm, while the pocket length is less than 50 mm. The bonding method involves spot bonding between the films, achieved by adhering the films together between crown portions of bosses on one film with molten material on the other film under a low pressure process, for instance achieved by provision of air pressure through adaptation of production apparatus, for instance die portions.

27 Claims, 2 Drawing Sheets

(51) Int. Cl.
 *B29C 65/00* (2006.01)
 *B32B 37/15* (2006.01)

GAS FILLED CROSSLAMINATE AND METHOD AND APPARATUS FOR ITS MANUFACTURE

RELATED APPLICATIONS

This application is a 35 U.S.C. §371 National Phase Application of and claims the benefit and priority to PCT/EP2010/059751 filed 7 Jul. 2010 (07/07/2010) (07.07.2010), published as WO/2011/003952 on 13 Jan. 2001 (01/13/2011) (13.01.2011), which claims the benefit of and priority to GB 0911822.5 filed 8 Jul. 2009 (07/08/2009) (08.07.2009).

BACKGROUND OF THE INVENTION

1. Field of the Invention

The main purpose of the present invention is to provide crosslaminates of low gauge with an improved feel of substance.

2. Description of the Related Art

A crosslaminate comprising a film (A) which has a waved shape and a film (B) which has a flat shape is known from WO02/102592 Rasmussen, and a crosslaminate comprising two films (A) and (B) which both have waved shape, with the directions of the two sets of waves crossing each other, is known from WO04/054793 Rasmussen. The general technology of crosslaminates, the purposes of the waving (fluting) and methods and apparatus to achieve this structure are explained in these two publications.

SUMMARY OF THE INVENTION

One purpose of the fluted shape is to obtain improved stiffness in respect of bending, and another purpose is to give the crosslaminate an improved feel of substance. A further purpose is to improve the heat seal properties. It has also been found that the fluted shape improves the tear propagation resistance.

With the increased request for raw material saving there is an increasing need to reduce the weight per square meter of such fluted crosslaminates and crosslaminates of related structures, while still obtaining good stiffness with respect to bending and a clearly improved feel of substance, compared to the stiffness and feel of flat crosslaminates. These goals are objectives of the present invention, and in a first aspect of the invention are achieved by a suitable encasement of gas (normally atmospheric air) between the laminated films.

It is known from the above mentioned WO02/102592, claims 17 and 25, that the flutes can be flattened at intervals and bonded across each ones entire width to form a row of narrow closed elongated pockets. The encased gas (e.g. atmospheric air) helps to provide the laminate with increased feel of substance and increased stiffness in one direction.

In trials preceding the present inventions the inventors have repeated the fluting/crosslaminating procedure described in the example in WO02/102592, however with a much lower gauge of each of the two films in the crosslaminate, namely 20 g m$^{-2}$ referring to the non-fluted shape. The result was a very "sloppy" laminate. Then the flutes were flattened and bonded at intervals by means of a simple pair of sealer bars heated to 105° C., so as to encase the air in each of the flutes. This considerably increased the feel of "substance" and the stiffness in one direction.

However, this encasement of air also proved to cause problems, e.g. attempts to carry out flexographic printing on the crosslaminate gave a poor result. Furthermore, measurements of friction between two sheets of the crosslaminate turned perpendicular to each other (like stacked bags) showed very low values, for the coefficient of friction.

The basic idea behind a first aspect of the present invention is that the gas (air) should not be encased in a "one dimensional" pocket namely a pocket which comprises only one flute, but should be encased in a "two dimensional" pocket comprising several flutes, in such a way that within each pocket there is a passage for gas from each flute to one or both of the adjacent flutes.

To try this, the bonding between the waved film (A) and the flat film (B) was not formed as a line bonding as in the known procedure, but was made a spot-bonding, and the encasement of gas was not by transverse welding lines alone, but by a combination of transverse and longitudinal welding lines. In this manner, the gas could freely move from flute to flute within each of the pockets formed by the two systems of welding lines.

This very considerably improved the printing quality, since the gas was removed from the locations which came under pressure. When the printing pressure was released, the gas returned and reshaped the flute. It was also found that the handle of the product was improved.

Furthermore it is believed that bags made from such film will show better stacking properties, e.g. when the content consist of coarse grains. This effect will be similar to the mentioned effect of printing.

In accordance with these remarkable results, the first aspect of the present invention 1, describes a crosslaminate comprising at least two bonded-together films (A) and (B), each comprising an orientable, crystalline thermoplastic polymer material and each being uniaxially oriented or being biaxially oriented with one direction dominating, the directions in (A) and (B) crossing each other, the bonding being an intermittent bonding which leaves more than 50% of the film area unbonded and which forms pockets to encapsulate gas, whereby the gas within each pocket has a volume which referring to the relaxed state of the laminate and 1 atmosphere ambient pressure is at least double the volume of the polymer material, where a) the gauge of each of the films (A) and (B) is at the highest 30 g m$^{-2}$ in the form it has in the crosslaminate, b) the bonding consists in a combination of a pattern of rectilinear or curved bonding lines (4), which are combined to form the gas encapsulating pockets, and within each pocket at least 5 spot bonds (3), and c) the longest extension of each pocket in any direction is at the highest 50 mm. In accordance with these remarkable results, the first aspect of the present invention also describes a method of manufacturing a crosslaminate comprising at least two bonded-together films (A) and (B), each comprising an orientable, crystalline thermoplastic polymer material in which each is supplied with uniaxial orientation or being biaxially oriented with one direction dominating, and the directions in films (A) and (B) is brought to cross each other, bonding being carried out as an intermittent bonding which leaves more than 50% of the film area unbonded and which forms pockets to encapsulate gas, whereby the gas within each pocket has a volume which referring to the relaxed state of the laminate and 1 atmosphere ambient pressure at least is double the volume of the polymer material, where a) the gauges of starting materials and conditions of orientation are such that the gauge of each of the films (A) and (B) is at the highest 30 g m"$^2$ in the form it has in the crosslaminate, b) the bonding is carried out as a combination of a patterns of rectilinear or curved bonding lines (4), which are combined to form the gas encapsulating pockets, and within each pocket at least 5 spot bonds (3) and such that c) the longest extension of each pocket in any direction is at the highest 50 mm.

In this connection the volume of the gas in a certain pocket can be determined by cutting out the pocket and measuring its buoyancy in water optionally containing a low level of surfactant to minimize air bubble attachment at the product surface, while the corresponding volume of the polymer material is determined by the weight of the pocket divided by the density of the polymer material.

In this structure one film (A) and optionally also the second film (B) may have a fluted shape, where the film (A) has a fluted shape, the pitch of the flutes (103) measured from middle to middle of adjacent flutes on the same side of film (A) is at the highest 3 mm, the bonding spots (2) are arranged on the crests of the flutes of (A) on the side facing (B), the distance (104) from middle to middle of adjacent spots (2) measured along the flutes, is at the highest 3 mm, and each encapsulated pocket comprises at least 2 flutes, where the film (B) also has a fluted shape the pitch of said flutes (105) measured from middle to middle of adjacent flutes on the same side of film (B) is at the highest 3 mm, and the bonding spots (2) are arranged on the crests of the flutes on the side of (B) facing (A) and wherein the film (A) is supplied with cup shaped or trough shaped bosses, and the spot-bonding is localized to crown portions or base portions of the bosses. However, there is the alternative possibility that one film (A) is supplied with cup shaped or trough shaped bosses, whereby the spot-bonding is localised to crown portions or base portions of all or some of the bosses, as further explained below. A third film (C), supplied with similar bosses, may be included in such laminate. These possibilities a crosslaminate wherein the film (A) is supplied with cup shaped or trough shaped bosses, and the spot-bonding is localized to crown portions or base portions of the bosses, wherein the film (B) is an unembossed film, in form of a coat produced by extrusion coating so as to establish the orientation of (B) as a longitudinal melt orientation, and to establish the spot-bonding simultaneous with the coating when the molten (B) touches the crown portions or based portions of bosses on (A), the lamination pressure being adjusted such that more than 50% of the film area is left unbonded, whereas the dominating direction of orientation of (A) forms an angle to the longitudinal direction, further comprises a third film (C) on the side of (A) which is opposite to (B) which film (C) is uniaxially oriented or is biaxially oriented with one direction dominating, and which also is supplied with cup shaped or trough shaped bosses, and the film (B) is an unembossed film in form of a tie layer produced by extrusion lamination so as to establish the orientation of (B) as a longitudinal melt orientation, and to establish the spot-bonding when the molten (B) touches the crown portions or base portions of bosses on (A) and the crown portions or base portions of bosses on (C), the laminate pressure being adjusted such that more than 50% of the area of each of the films (A) and (C) is left unbonded, whereas the dominating directions of (A) and (C) from an angle to the longitudinal direction, wherein the dominating direction of (C) crosses the dominating direction of (A) and a crosslaminate comprising at least two bonded-together films (A) and (B), each comprising an orientable, crystalline thermoplastic polymer material and each being uniaxially oriented or being biaxially oriented with one direction dominating, said directions in (A) and (B) crossing each other, the bonding comprising a spot bonding, where a) the gauge of each of the films (A) and (B) is at the highest 30 g m$^{-2}$ in the form it has in the crosslaminate, b) film (A) is supplied with cup shaped or trough shaped bosses, the spot-bonding being localized to crown portions or to base portions of such bosses on one side of film (A), c) film (B) is an unembossed film, d) the bonding between the film (A) and the film (B) is a spot bonding established on crown portions or base portions of bosses on (A) while at least 25% and preferably at least 50% is kept free of bonding, and e) the dominating direction of orientation in (A) forms an angle higher than zero and preferably higher than 10° to the longitudinal direction. By "cup shaped or trough shaped bosses" is meant spots of the film in which both surfaces protrude to the same side. The spots can be elongated in on direction. Examples of such embossment are given or referred to in WO9112125, U.S. Pat. No. 5,205, 650 FIGS. 1, 2a, 2b and 3, and the microphotos shown in WO2009090208.

The word "bosses" is also occasionally used to indicate spot or line which is essentially thicker than the adjacent film material, and thereby protruding to both sides of the film but this is not the meaning in the present specification.

The crosslaminate consisting of an embossed film and an unembossed film can be characterised as a "cellular crosslaminate". In the description above it is mentioned than film (B) can be bonded either to crown portions or to base portions of bosses on (A). The above mentioned Figures in U.S. Pat. No. 5,205,650 show a clear distinction between the bases of bosses on one side and crowns on the other side, and it is easy to image film (B) laminated to one or the other side of this embossed film. (These Figures show an embossment confined to a limited part of the film, but the description of the patent teaches that the embossment may comprise the entire film). Contrary to these Figures, the microphotos in WO2009090208 show a waved type of embossment with crowns on both sides of the film and no base portions of the bosses, and it is easy to imagine film (B) laminated to crown portions on one or the other side of this embossed film.

The film (B) which is laminated to the embossed film (A) is a flat film prior to the lamination, but due to the laminate forces and subsequent tendency to shrinkage, film (B) may in the final laminate have lost its flatness.

It is noted that the low weight crosslaminate structure, comprising the film (A) with cup shaped or trough shaped bosses, and the unembossed film (B), which has been formed by extrusion coating, and thereby has just "kissed" film (A) and formed spot bonds, in itself is considered inventive independent of the formation of pockets to encapsulate the gas. This second aspect of the invention is a crosslaminate comprising at least two bonded-together films (A) and (B), each comprising an orientable, crystalline thermoplastic polymer material and each being uniaxially oriented or being biaxially oriented with one direction dominating, said directions in (A) and (B) crossing each other, the bonding comprising a spot bonding, where a) the gauge of each of the films (A) and (B) is at the highest 30 g m$^{-2}$ in the form it has in the crosslaminate, b) film (A) is supplied with cup shaped or trough shaped bosses, the spot-bonding being localized to crown portions or to base portions of such bosses on one side of film (A), c) film (B) is an unembossed film, d) the bonding between the film (A) and the film (B) is a spot bonding established on crown portions or base portions of bosses on (A) while at least 25% and preferably at least 50% is kept free of bonding, and e) the dominating direction of orientation in (A) forms an angle higher than zero and preferably higher than 10° to the longitudinal direction. The purpose of this second aspect of the invention is to provide a low weight crosslaminate with improved stiffness, feel of substance and a textile like handle. A method of crosslaminating films comprising the steps: 1) arranging two films (A) and (B), each comprises an orientable, crystalline thermoplastic polymer material and being uniaxially oriented or being biaxially oriented with one direction dominating, in face-to-face relationship with the the orientation directions in (A) and (B) crossing one another; 2)

bonding the films to one another by a spot-bonding process to form a crosslaminate, where: a) a gauge of each of the films (A) and (B) is at the highest 30 g/m$^2$, measured as in the laminate; b) film (A) as used in step 1) has cup shaped or trough shaped bosses; c) the bonding in step 2) is localized to cover crown portions or base portions of the bosses on the side of the film (A) facing film (b); d) film (B) is formed as an unembossed film by extrusion carried out in a manner to establish its orientation as a longitudinal melt orientation and as to establish the spot-bonding in step 2) as the molten material of (B) touches the crown or base portions of bosses on film (A) while keeping at least 25%, preferably at least 50%, of the facing area of the films without any bonding, and wherein the said orientation of film (A) is at an angle to the longitudinal direction.

To increase the tear propagation resistance and the peel strength of the laminate, the films may further be bonded together by curved or recti linear bonds, which for these purposes need not form gastight pockets.

Most processes to produce cup or trough shaped bosses will make the film in these bosses thinner than the surrounding film. However, in the structure described below, most of the film portions in the bosses are thicker than the adjacent film portions, and this is an advantage for the stability of the structure.

BRIEF DESCRIPTION OF THE DRAWINGS

The invention is illustrated in the accompanying sketches.

DETAILED DESCRIPTION OF THE INVENTION

Figure 1:
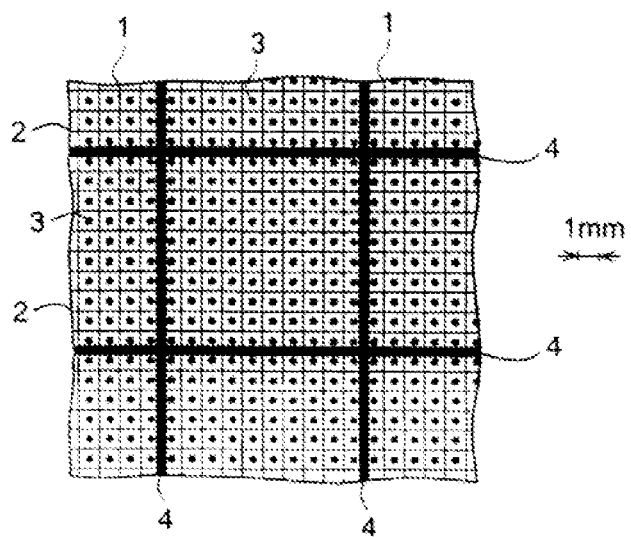
FIG. 1 shows a crosslaminate of two oriented films (A) and (B), which both are fluted. In each film the main direction of orientation coincides with the direction in which its flutes extend.

As already stated, a main objective of both aspects of the invention is to reduce the square meter weight of crosslaminates while still obtaining good stiffness with respect to bonding and especially a feel of substance. Accordingly, a crosslaminate comprising at least two bonded-together films (A) and (B), each comprising an orientable, crystalline thermoplastic polymer material and each being uniaxially oriented or being biaxially oriented with one direction dominating, the directions in (A) and (B) crossing each other, the bonding being an intermittent bonding which leaves more than 50% of the film area unbonded and which forms pockets to encapsulate gas, whereby the gas within each pocket has a volume which referring to the relaxed state of the laminate and 1 atmosphere ambient pressure is at least double the volume of the polymer material, where a) the gauge of each of the films (A) and (B) is at the highest 30 g m$^{-2}$ in the form it has in the crosslaminate, b) the bonding consists in a combination of a pattern of rectilinear or curved bonding lines (4), which are combined to form the gas encapsulating pockets, and within each pocket at least 5 spot bonds (3), and c) the longest extension of each pocket in any direction is at the highest 50 mm. set the limit of 30 g m$^{-2}$ for the gauge of each of the films (A) and (B) in the form which the film has in the crosslaminate and a crosslaminate comprising at least two bonded-together films (A) and (B), each comprising an orientable, crystalline thermoplastic polymer material and each being uniaxially oriented or being biaxially oriented with one direction dominating, said directions in (A) and (B) crossing each other, the bonding comprising a spot bonding, where a) the gauge of each of the films (A) and (B) is at the highest 30 g m$^{-2}$ in the form it has in the crosslaminate, b) film (A) is supplied with cup shaped or trough shaped bosses, the spot-bonding being localized to crown portions or to base portions of such bosses on one side of film (A), c) film (B) is an unembossed film, d) the bonding between the film (A) and the film (B) is a spot bonding established on crown portions or base portions of bosses on (A) while at least 25% and preferably at least 50% is kept free of bonding, and e) the dominating direction of orientation in (A) forms an angle higher than zero and preferably higher than 10° to the longitudinal direction. However, this gauge can with advantage be at the highest 20 g m$^{-2}$ or even no more than 15 g m$^{-2}$.

Process steps for manufacture of the crosslaminate which exhibited fluted shape, as these crosslaminates wherein the film (A) has a fluted shape, the pitch of the flutes (103) measured from middle to middle of adjacent flutes on the same side of film (A) is at the highest 3 mm, the bonding spots (2) are arranged on the crests of the flutes of (A) on the side facing (B), the distance (104) from middle to middle of adjacent spots (2) measured along the flutes, is at the highest 3 mm, and each encapsulated pocket comprises at least 2 flutes and wherein the film (B) also has a fluted shape the pitch of said flutes (105) measured from middle to middle of adjacent flutes on the same side of film (B) is at the highest 3 mm, and the bonding spots (2) are arranged on the crests of the flutes on the side of (B) facing (A), appear from the above mentioned publications WO02/102592 Rasmussen and WO04/54793 Rasmussen, but in the first aspect of the present invention, to these well known steps there must be added the step of further sealing the films together in a pattern of rectilinear or curved lines (1), which are combined to form the gas encapsulating pockets, each surrounding at least 5 of the spot bonds, which were formed by the known steps. The longest extension of each pocket in any direction is at the highest 50 mm, preferably at the highest 30 mm and preferably at least 6 mm.

An embossed film, which for the reason stated above is particularly suitable for manufacture of the product described herein, is disclosed in WO2009090208. This was not published when the priority forming patent application for the present application was filed. Such film is formed of thermoplastic polymer material and comprises an array of parallel band-shaped, linearly extending regions (a) and distinct therefrom linearly extending webs (b) which integrally connect said regions. Each web (b) is at each location of its linear extension thinner than the adjacent portions of regions (a).

In this film both (a) and (b) are oriented having at each location a dominating direction of orientation. The film is characterized in that the dominating direction of orientation in the regions (a) forms angles (v) higher than zero but no higher than 80° with the direction in which (a) extends, and the webs (b) comprise arrays of linear furrows (c) which are necking-down zones, said furrows forming angles (u) higher than (v) to the directions in which (a) extends. The film for use in the present invention is further characterised in that the regions are waved, each wave extending over the width of such region and the webs being shorter than the adjacent parts of the regions (a) so as to force (a) to wave. It is this waving which forms the cup or trough shaped bosses.

The method of producing such film starts with a film having a predominant direction of orientation. The film is stretched by means of a pair of mutually intermeshing first grooved rollers in a direction which is different, but at the highest 80° different, from the predominant original direction of orientation in the film. The method is characterized in that at least one of the grooved rollers in the pair has crests with edges which are sufficiently sharp to form a distinct division between parallel, linearly extending webs (b) of film material, which have been coldstretched between the crests of the two first grooved rollers and intervening linearly extending bandshapes regions (a), which have laid on the sharp edged crests and have not been stretched or have been stretched to a smaller extend between the said grooved rollers. The contraction which produces the waving of (a) and thereby the bosses, arises inherently if not counteracted.

In the first aspect of the invention, the pattern bonding lines to encase air consists in its simplest form, two arrays each of parallel straight lines, which arrays crisscross each other. This can be done by means of two pairs of sealing rollers, one pair working in succession to the other, and each pair consisting of a hot steel roller working against a hot, silicone rubber coated roller. One of the steel rollers may be supplied with a pattern of circular crests, e.g. 0.5 mm wide, and the other with axial cogs, e.g. also 0.5 mm wide. Alternatively they may both be supplied with a pattern of helical crests one right turned and the other left turned.

In a more advanced form this pattern is a honeycomb pattern. This provides better stiffness, but requires more expensive sealing rollers. One roller can be a hot patterned steel roller, working against a hot silicone rubber coated roller.

These two patterns are only examples of the shapes of the pockets. It is noted that the pattern of bonding lines (4) which form the pocket for encapsulation of air, additionally has the function that it increases the tear propagation resistance and the peel strength of the laminate.

During the sealing process to form pockets and encapsulate gas (normally air) the ambient pressure may be kept somewhat higher than the normal atmospheric pressure to achieve a suitable internal tension in the final laminate.

Each bonding between the films (A), (B) and optionally (C) is preferably established through one or more coextruded lamination layers.

Most conveniently, more than 50% of each film (A) and (B) consists of HDPE, LLDPE, crystalline PP or blends or copolymers based on polyethylene or polypropylene.

While the first and second aspect of the present invention primarily have been conceived with a view to water impermeable packaging film, they can also be applied to breathable film, e.g. for sanitary purposes. To this end there may be perforations collected in distinct areas, which areas are interspersed with the air encapsulating pockets.

In conventional extrusion lamination of two solid films or in extrusion coating, which consists in laminating a directly extruded film to a preformed solid film, the lamination takes place between rollers, and there is applied a relatively high lamination pressure, since otherwise air may be entrapped. However, in the present invention an aim is to entrap a big volume of air, forming a cellular kind of product. To achieve this, a method of laminating a solid film with a molten directly extruded flat film while introducing spaces of gas between the two films, where the lamination pressure is established on one side of the film assembly in the form of a pressurized air film, and on the other side either by a roller surface or by a pressurized air film and an apparatus for extrusion coating a solid film or extrusion laminating two solid films, comprising a flat die for mono- or coextrusion of a film, and means to bring the solid and the extruded film in face-to-face relationship as an assembly and apply a laminating pressure while at least each surface of the extruded film is in molten or semi molten state, where the means to apply a lamination pressure comprise on one side of the assembly first means to form a first pressurized air film, and on the other side either a roller surface or a second means to form a second pressurized air film, further comprising means to adjust the air pressure exercised on the assembly with subclaims are highly preferable. The formulation of a pressurized air film, normally under use of a microporous wall in a die through which an air flow is pressed, is commonly used as "air lubrication" for many different purposes. In the present invention it is also used as means to set up an easily adjustable and low lamination pressure which at least on one side is contactless, and which enhances the entrapment of air. In this connection it is advantageous but not in all cases necessary that the solid film has been embossed before the lamination.

A pressurized air film is normally, as explained above, produced by pressing the air through a die wall consisting of microporous material. This is normally formed by sintering. Alternatively the die wall may be supplied with a great multitude of fine holes, e.g. formed by laser treatment. In the present invention the pressurized air film may also be formed by a single slot which traverses the entire width of the film assembly e.g. of 0.1-0.2 mm gap, formed by laser treatment or spark erosion.

The laminating pressure can be adjusted by adjustment of the spacing of the air film or air films and/or by adjusting the air flows.

In FIG. 1 lines (1) show the middle of the longitudinally extending outside crests of the flutes on film (A).

Similarly, lines (2) show the middle of the transversely extending outside crests of the flutes on film (B). The dots (3) show the spot-bonding, which has been established between portions of the two arrays of inside crests. This structure can be made by the procedure described in the example of WO04/54796 Rasmussen, except for the gauge of the films (A) and (B), which must be lower. A perspective view of this structure is shown in FIG. 1 in the same patent specification.

The new feature is the two arrays of sealing lines (4), which cross each other. Preferably this sealing is made absolutely tight to encase the air.

As in the above mentioned example, the bonding between the films is established through coextruded lamination layers.

In addition to the primary function to encase air, such pattern of sealing lines also serves to improve the tear propagation resistance. For that purpose the sealing needs not be tight, and a "semi-encasing" pattern of rectilinear or curved lines will be satisfactory.

FIG. 1 shows the wavelength in both films (A) and (B) being 1 mm, the encasement being square formed with edge 10 mm, and the width of the linear seals being 0.5 mm. These measures are generally convenient, but big variations are possible.

Figure 2:
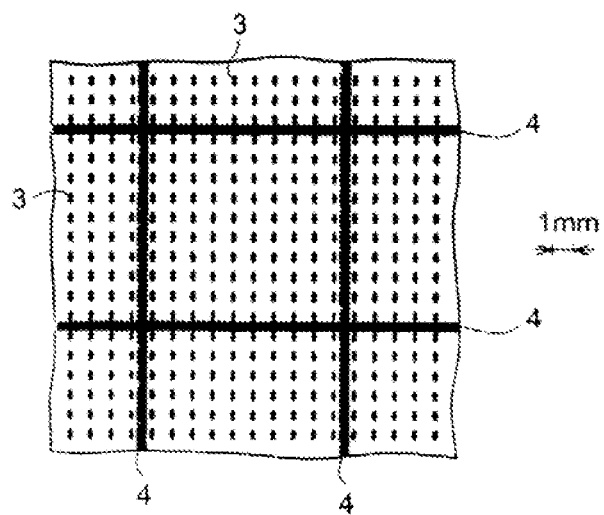
FIG. 2 shows a crosslaminate of an embossed film (A), which is oriented under acute angles to the machine direction, and a generally flat film (B) formed by extrusion coating, by which it has received melt orientation in the machine direction. During the coating the two films have "kissed" each other to form spot-bonding, such that more than 50% of the film area is left unbonded.
Figure 3:
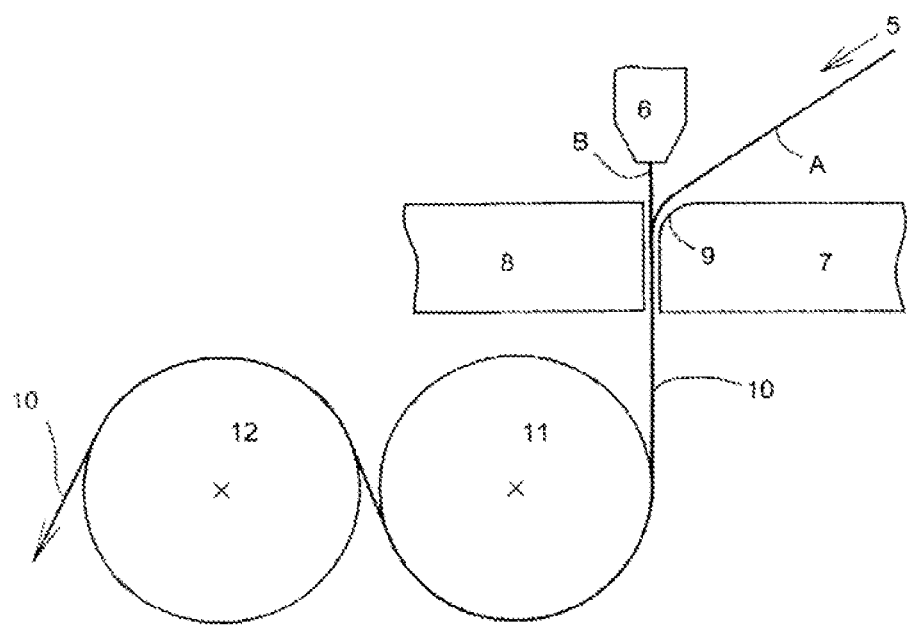
FIG. 3 shows this special carrying out of extrusion coating, referred to as the second aspect of the invention.

In FIG. 2 the dots (3) here shown elongated in the machine direction, again illustrate the spot-bonding between the films (A) and (B). The bonding is established between protruding cup shaped or trough shaped bosses by an extrusion coating process, which in principle is shown in FIG. 3. The embossed film (A), which is molecularly oriented on bias, preferably has a structure disclosed in WO2009090208, briefly explained above in the general description, and may conveniently consist of HDPE. The coating may e.g. consist of LLDPE, LDPE, or a lower melting ethylene copolymer.

As a matter of simplification of the sketch, FIG. 2 shows the spot-bonding in a very regular pattern, but in actual fact it will be more ramdomized.

In FIG. 3 the embossed film (A) with orientation on bias is fed into the coating device as shown by the arrow (5). It may be taken from a reel or may come directly from the embossment station. The molten film (B) comes from a flat extrusion die (6) and becomes melt oriented in the machine direction by the draw-down, e.g. from exit slot gap 0.25-0.5 mm to a final thickness between 5-20 micrometer.

The coating takes place between the two very schematically shown air film forming dies (7) and (8). The edge (9) of die (7), over which film (A) bends, is rounded, e.g. with radius about 1 cm. The surfaces of the two dies, which face the two films, are produced from microporous material to form pressurized air films, and so is the rounded edge (9). The pressurized air film formed by die (7) and blowing on film (A) has ambient temperature, while the pressurized air film formed by die (8) and blowing towards film (B) has a temperature essentially lower than the exit temperature of the extrusion die (7) but high enough to cause bonding.

The coated film is a crosslaminate of the embossed film (A), which is oriented on bias, and the coat, which is melt oriented in the machine direction. It is hauled off by the cooling roller (11) and the rubber roller (12). The two rollers are driven by the same circumferential velocity.

They are very close to each other, but to avoid ruining of the embossed structure they don't press against each other.

The cross laminate (10) proceeds to winding (not shown). All the way through the shown process the tension is kept sufficiently low to avoid ruining of the embossment. The devices for this are not shown.

A suitable bonding, leaving more than 25% of the film area unbonded, is produced by adjustments of 1) the temperature at which film (B) leaves the extrusion die, 2) the positions of dies (7) and (8), 3) the temperature of the air film produced by die (8), and 4) the air velocities of the two air streams.

The adjustment is such that the two films only "kiss" each other.

Between roller (12) and the spooling up there may be sealing rollers to form the lines (4) shown in FIG. 2. These may consist of a hot patterned steel roller working against a hot silicone rubber coated roller.

Example 1

In this and the following two examples the process and apparatus are basically as described in connection with FIG. 3. The flat extrusion die (6) is constructed for coextrusion of two components. The gap of the exit orifice is 0.5 mm. In the present example 8-0% of the extruded film consists of HMWHDPE of d=0.95 density 0.95 g/mL and 20% of an ethylene copolymer ("Attane") melting at about 90° C. and of m.f.i.=1.0. The lower melting layer is supplied on the side which will face the solid film. The extrusion temperature is 270° C. The extrusion throughput and the velocity of rollers (11) and (12) are adjusted to produce a film thickness calculated of to become 10 micrometers. By the longitudinal draw down in the ratio 50 to 1 the extruded film gets a strong melt orientation.

The solid film (A) is the single film produced according to example 3 in WO2009/090208. It is deeply embossed with crests of bosses protruding from each side. It is biaxially oriented, differently within different narrow regions, but with a direction near 45° dominating. While it advances towards the die (7) which supplies a pressurized air film of ambient temperature, all tendencies to wrinkling are removed by means of a driven "banana roller". The tension in film (A) when it meets the air die (7) is adjusted to be near zero so as to maintain maximum degree of embossment. It is turned so that its low melting side will face the extruded film (B).

Throughout the air die (8), which is heat insulated, hot air is blown. The temperature of the air as it exits this die is adjusted to 100° C. The space between dies (7) and (8) is about 5 mm, and the length of the zone in which the two films are under air pressure is above 20 mm. The distance from the exit orifice of the extrusion die (6) to the two air-dies (7) and (8) is also about 20 mm.

The air for the two dies (7) and (8) are taken from the same air reservoir, the pressure of which is adjustable, and the resistance to air flow through the microporous walls in the two dies is practically equal, thus the air filing of both sides have practically the same pressure. The air for die (8) is heated before it meets the die (8).

Between the dies (7) and (8) and the first haul off roller (17) air of ambient temperature is blown onto the laminated film assembly (10). This is not shown in the drawing.

By trial and error the pressure in the air reservoir is adjusted to a value which produces the desired degree of lamination, i.e. the desired percentage of bonded areas. This may conveniently be above 25-30%. It is determined by microscopy of samples.

Example 2

This deviates from example 1 in that the extruded film is a one layer film consisting of the copolymer (Attane) which formed the lamination layer on the extruded film of example 1. In all other respects example 1 is followed.

In this procedure the extrusion die could have been a monoextrusion die, and this would be a simplification. When using such monoextrusion it is expected that plain LLDPE or HDPE would be applicable in spite of the higher melting points, but this would make the adjustment of cooling conditions more complicated.

Example 3

In this example the invention is used for extrusion lamination of two solid films with mutually crossing directions of orientation. These two films are the same as the solid film (B) used in examples 1 and 2. As in example 2 the extruded film (B) is the copolymer of (Attane) having melting point around 90° C., and its thickness in the laminate is about 10 micrometers.

The extruded film (B) is applied between the two solid films, thus the line shown in FIG. 3 is supplemented by apparatus for feeding the additional solid film over the air die (8), and the latter has a rounded edge like edge (9) on die (7).

In this case air of ambient temperature is used for both pressurized air films formed by dies (7) and (8), and there is applied an adjusted flow of cooling air to the extruded film between the exit orifice of the extrusion die (6) and the two air dies (7) and (8).

I claim:

1. A crosslaminate comprising at least two bonded-together films (A) and (B), each comprising an orientable, crystalline thermoplastic polymer material and each being uniaxially oriented or being biaxially oriented with one direction dominating, the directions in (A) and (B) crossing each other, the bonding being an intermittent bonding which leaves more than 50% of the film area unbonded and which forms pockets to encapsulate gas, whereby the gas within each pocket has a volume which referring to the relaxed state of the laminate and 1 atmosphere ambient pressure is at least double the volume of the polymer material, where
  a) the gauge of each of the films (A) and (B) is at the highest 30 g m$^{-2}$ in the form it has in the crosslaminate,
  b) the bonding consists in a combination of a pattern of rectilinear or curved bonding lines (4), which are combined to form the gas encapsulating pockets, and within each pocket at least 5 spot bonds (3), and
  c) the longest extension of each pocket in any direction is at the highest 50 mm.

2. The crosslaminate according to claim 1, wherein the gauge of the film (A) is at the highest 20 g m$^{-2}$ in the form it has in the crosslaminate.

3. The crosslaminate according to claim 1, wherein the longest extension of each pocket in any direction is at the highest 30 mm.

4. The crosslaminate according to claim 1, wherein the film (A) has a fluted shape, the pitch of the flutes (103) measured from middle to middle of adjacent flutes on the same side of film (A) is at the highest 3 mm, the bonding spots (2) are arranged on the crests of the flutes of (A) on the side facing (B), the distance (104) from middle to middle of adjacent spots (2) measured along the flutes, is at the highest 3 mm, and each encapsulated pocket comprises at least 2 flutes.

5. The crosslaminate according to claim 4, wherein the film (B) also has a fluted shape the pitch of said flutes (105) measured from middle to middle of adjacent flutes on the same side of film (B) is at the highest 3 mm, and the bonding spots (2) are arranged on the crests of the flutes on the side of (B) facing (A).

6. The crosslaminate according to claim 1, wherein the film (A) is supplied with cup shaped or trough shaped bosses, and the spot-bonding is localized to crown portions or base portions of the bosses.

7. The crosslaminate according to claim 6, wherein the film (B) is an unembossed film, in form of a coat produced by extrusion coating so as to establish the orientation of (B) as a longitudinal melt orientation, and to establish the spot-bonding simultaneous with the coating when the molten (B) touches the crown portions or based portions of bosses on (A), the lamination pressure being adjusted such that more than 50% of the film area is left unbonded, whereas the dominating direction of orientation of (A) forms an angle to the longitudinal direction.

8. The crosslaminate according to claim 7, further comprises a third film (C) on the side of (A) which is opposite to (B) which film (C) is uniaxially oriented or is biaxially oriented with one direction dominating, and which also is supplied with cup shaped or trough shaped bosses, and the film (B) is an unembossed film in form of a tie layer produced by extrusion lamination so as to establish the orientation of (B) as a longitudinal melt orientation, and to establish the spot-bonding when the molten (B) touches the crown portions or base portions of bosses on (A) and the crown portions or base portions of bosses on (C), the laminate pressure being adjusted such that more than 50% of the area of each of the films (A) and (C) is left unbonded, whereas the dominating directions of (A) and (C) from an angle to the longitudinal direction.

9. The crosslaminate according to claim 8, wherein the dominating direction of (C) crosses the dominating direction of (A).

10. The crosslaminate according to claim 1, wherein the pattern of bonding lines consist in two arrays each of parallel straight lines, which arrays crisscross each other.

11. The crosslaminate according to claim 1, wherein the pattern of bonding lines is a honeycomb pattern.

12. The crosslaminate according to claim 1, wherein the bonding between the films has been established through coextruded lamination layers, which have melting points lower than the polymer material forming the major proportion of the film.

13. The crosslaminate according to claim 1, wherein more than 50% of each film (A) and (B) comprises HDPE, LLDPE, LDPE, crystalline PP or copolymers based on polyethylene or polypropylene, or blends of such materials.

14. The crosslaminate according to claim 1, wherein in addition to the pockets with encapsulated gas, the laminate also comprises perforated areas.

15. A crosslaminate comprising at least two bonded-together films (A) and (B), each comprising an orientable, crystalline thermoplastic polymer material and each being uniaxially oriented or being biaxially oriented with one direction dominating, said directions in (A) and (B) crossing each other, the bonding comprising a spot bonding, where
  a) the gauge of each of the films (A) and (B) is at the highest 30 g m$^{-2}$ in the form it has in the crosslaminate,
  b) film (A) is supplied with cup shaped or trough shaped bosses, the spot-bonding being localised to crown portions or to base portions of such bosses on one side of film (A),
  c) film (B) is an unembossed film,
  d) the bonding between the film (A) and the film (B) is a spot bonding established on crown portions or base portions of bosses on (A) while at least 25% is kept free of bonding, and
  e) the dominating direction of orientation in (A) forms an angle higher than zero to the longitudinal direction.

16. The crosslaminate according to claim 15, wherein the unembossed film (B) is in form of a coat produced by extrusion coating so as to establish the orientation of (B) as a longitudinal melt orientation, and to establish the spot-bonding simultaneous with the coating when the molten (B) touches the crown portions or the base portions of bosses on (A).

17. The crosslaminate according to claim 15, wherein the two films further are bonded together by curved or reactilinear bonds.

18. The crosslaminate according to claim 15, wherein both films (A) and (B) have been supplied with a lower melting surface layers to facilitate the bonding.

19. The crosslaminate according to claim 15, wherein the film (B) is a mono-extruded film formed from a main constituent having a melting point at least 10° C. lower than the main constituent in film (A).

20. The crosslaminate according to claim 19, wherein the film (A) has been supplied with a lower melting surface layer to facilitate the bonding.

21. The crosslaminate according to claim 15, characterised in that more than 50% of each film (A) and (B) consists of HDPE, LLDPE, LDPE, crystalline PP or blends or copolymers based on polyethylene or polypropylene.

22. The crosslaminate according to claim 15, further comprises a third film (C) on the side of (A) which is opposite to (B) which film (C) is uniaxially oriented or is biaxially oriented with one direction dominating, and which also is supplied with cup shaped or trough shaped bosses, and the film (B) is an unembossed film in form of a tie layer produced by extrusion lamination so as to establish the orientation of (B) as a longitudinal melt orientation, and to establish the spot-bonding when the molten (B) touches the crown portions or base portions of bosses on (A) and the crown portions or base portions of bosses on (C), the laminate pressure being adjusted such that more than 25% of the area of each of the films (A) and (C) is left unbonded, whereas the dominating directions of (A) and (C) from an angle to the longitudinal direction.

23. A method of manufacturing a crosslaminate comprising at least two bonded-together films (A) and (B), each comprising an orientable, crystalline thermoplastic polymer material in which each is supplied with uniaxial orientation or being biaxially oriented with one direction dominating, and the directions in films (A) and (B) is brought to cross each other, bonding being carried out as an intermittent bonding which leaves more than 50% of the film area unbonded and which forms pockets to encapsulate gas, whereby the gas within each pocket has a volume which referring to the relaxed state of the laminate and 1 atmosphere ambient pressure at least is double the volume of the polymer material, where
  a) the gauges of starting materials and conditions of orientation are such that the gauge of each of the films (A) and (B) is at the highest 30 g m$^{-2}$ in the form it has in the crosslaminate,
  b) the bonding is carried out as a combination of a patterns of rectilinear or curved bonding lines (4), which are combined to form the gas encapsulating pockets, and within each pocket at least 5 spot bonds (3) and such that
  c) the longest extension of each pocket in any direction is at the highest 50 mm.

24. A method of crosslaminating films comprising the steps:
  1) arranging two films (A) and (B), each comprises an orientable, crystalline thermoplastic polymer material and being uniaxially oriented or being biaxially oriented with one direction dominating, in face-to-face relationship with the orientation directions in (A) and (B) crossing one another;
  2) bonding the films to one another by a spot-bonding process to form a crosslaminate, where:
    a) a gauge of each of the films (A) and (B) is at the highest 30 g/m$^2$, measured as in the laminate;
    b) film (A) as used in step 1) has cup shaped or trough shaped bosses;
    c) the bonding in step 2) is localised localized to cover crown portions or base portions of the bosses on the side of the film (A) facing film (b);
    d) film (B) is formed as an unembossed film by extrusion carried out in a manner to establish its orientation as a longitudinal melt orientation and as to establish the spot-bonding in step 2) as the molten material of (B) touches the crown or base portions of bosses on film (A) while keeping at least 25%, of the facing area of the films without any bonding, and wherein the said orientation of film (A) is at an angle to the longitudinal direction.

25. The method according to claim 24, further comprising step 3) after or simultaneously with step 2) of bonding the two films together by curved or straight linear bonds.

26. The method according to claim 25, wherein the bonding in step 2) involves blowing pressurized air against one or both outward facing sides of the pair of films (A) and (B) after the longitudinal orientation of film (B).

27. The method according to claim 26, wherein the pressurized air directed on the (B) film side of the film pair is heated to a temperature lower than the extrusion temperature but equal to or higher than the temperature required for the spot-bonding to take place.

\* \* \* \* \*